United States Patent
Karwath

(10) Patent No.: US 6,169,378 B1
(45) Date of Patent: Jan. 2, 2001

(54) ELECTRONICALLY COMMUTATED MOTOR WITH GALVANICALLY SEPARATE USER INTERFACE CIRCUIT

(75) Inventor: Arno Karwath, Rottweil (DE)

(73) Assignee: Papst Motoren GmbH & Co. KG, St. Georgen (DE)

( * ) Notice: Under 35 U.S.C. 154(b), the term of this patent shall be extended for 0 days.

(21) Appl. No.: 09/180,968

(22) PCT Filed: Jun. 3, 1997

(86) PCT No.: PCT/EP97/02880

§ 371 Date: Nov. 17, 1998

§ 102(e) Date: Nov. 17, 1998

(87) PCT Pub. No.: WO97/48178

PCT Pub. Date: Dec. 18, 1997

(30) Foreign Application Priority Data

Jun. 7, 1996 (DE) ............................ 296 10 083 U

(51) Int. Cl.⁷ .................................................. H02K 23/00
(52) U.S. Cl. .................. 318/254; 318/138; 318/439; 318/798
(58) Field of Search .................... 318/254, 439, 318/138, 798

(56) References Cited

U.S. PATENT DOCUMENTS

| Re. 34,609 | 5/1994 | Mueller et al. | 318/254 |
|---|---|---|---|
| 3,873,897 | 3/1975 | Mueller et al. | 318/138 |
| 4,588,933 | 5/1986 | Sun | 318/254 |
| 4,827,196 | 5/1989 | Odell et al. | 318/254 |
| 5,220,258 | 6/1993 | Hans et al. | 318/254 |

(List continued on next page.)

FOREIGN PATENT DOCUMENTS

| 32 15 001 A1 | 10/1983 | (DE) . |
|---|---|---|
| 41 05 162 A1 | 8/1992 | (DE) . |
| 42 22 092 A1 | 1/1994 | (DE) . |
| 42 23 208 A1 | 1/1994 | (DE) . |
| 43 05 767 A1 | 9/1994 | (DE) . |
| 43 06 307 A1 | 9/1994 | (DE) . |
| 94 14 498-U1 | 2/1995 | (DE) . |
| 43 44 448-A1 | 6/1995 | (DE) . |
| 0 318 938 A2 | 6/1989 | (EP) . |
| 0 467 085 A1 | 1/1992 | (EP) . |
| 0 643 473-B1 | 4/1998 | (EP) . |

OTHER PUBLICATIONS

WPI English Abstract of Krause/Lehmann DE 32 15 001–A1 of Oct. 27, '83.
WPI English abstract of Hans+Moini/Papst DE 40 19 338 (Dec. 19, '91) & EP 0 467 085–A1 (Jan. 22, '92).
WPI English Abstract of Kennel/Bosch DE 41 05 162–A1 of Aug. 27, '92.
WPI English Abstract of Heinz+/Miele DE 42 22 092–A1 of Jun. 29, '95.
WPI English abstract of Karwath+Moini/Papst DE 42 23 208–A1 of Jan. 20, '94.

(List continued on next page.)

Primary Examiner—Karen Masih
(74) Attorney, Agent, or Firm—Milton Oliver; Ware, Fressola, Van Der Sluys & Adolphson LLP

(57) ABSTRACT

The arrangement has a motor (16) which has an electronic commutator and during operation is supplied from alternating current (AC) mains (L, N) via a rectifier (52) connected thereto, and a direct current (DC) link (22, 58) connected to said rectifier (52) and having a DC voltage ($U_{ZK}$) of greater than 100 V. The motor has an arrangement (25, 27) fed from said alternating current mains (L, N) via a transformer (24) and for supplying electronic components (14, 20, 26) of the motor with a DC voltage, and a user interface (12) provided for transmission of data to or from the motor (16). Said user interface, with which a current supply (24b) electrically isolated from the motor (16) is associated, electrically isolated from the motor (16).

20 Claims, 3 Drawing Sheets

U.S. PATENT DOCUMENTS

Figure 1:
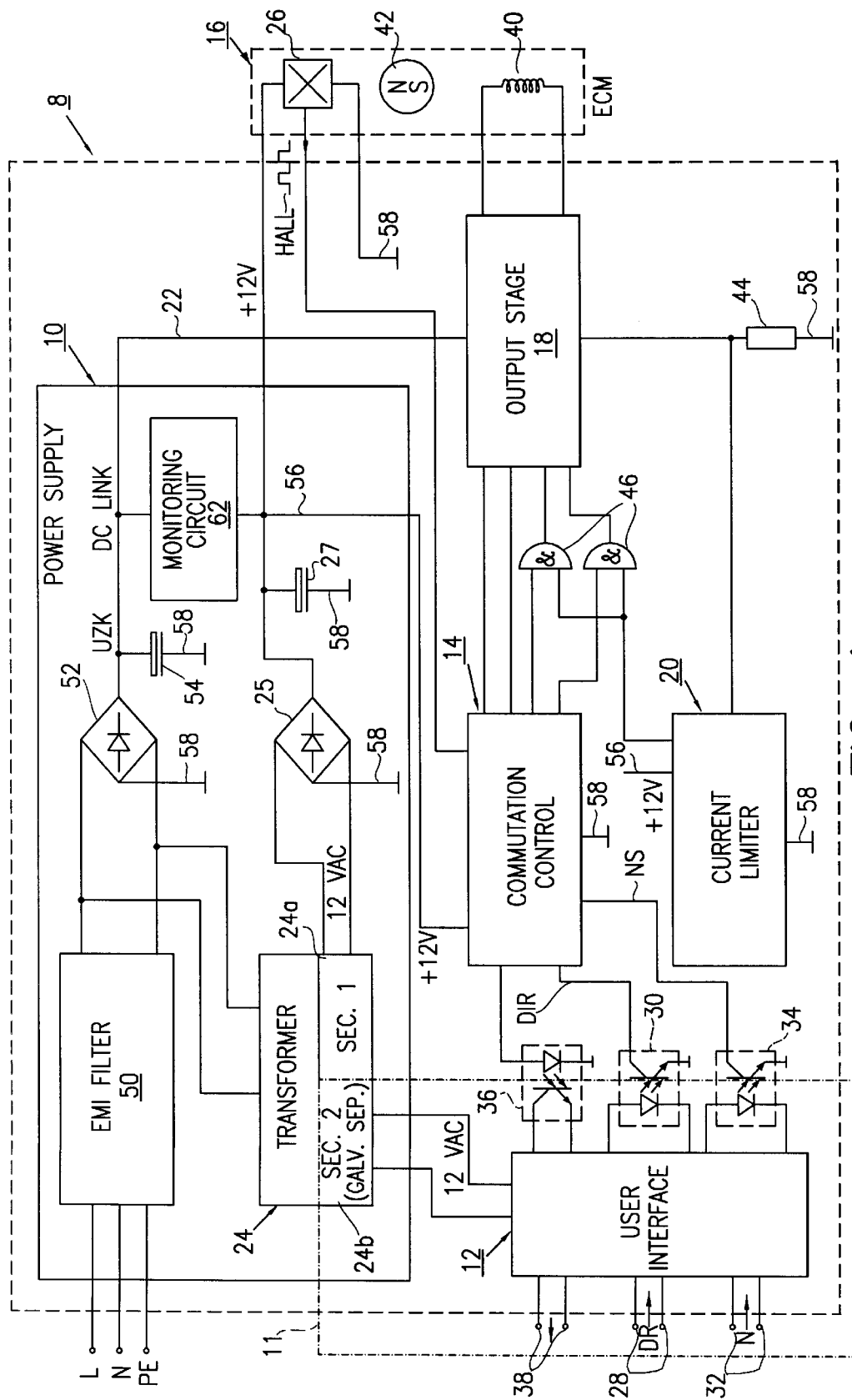

| | | | |
|---|---|---|---|
| 5,343,129 | 8/1994 | Hans et al. | 318/431 |
| 5,537,015 | 7/1996 | Karwath | 318/439 |
| 5,541,484 * | 7/1996 | DiTucci | 318/254 |
| 5,589,745 | 12/1996 | Hans et al. | 318/431 |
| 5,598,073 | 1/1997 | Hans et al. | 318/431 |
| 5,600,216 | 2/1997 | Karwath et al. | 318/291 |
| 5,751,128 * | 5/1998 | Chalupa et al. | 318/439 |

OTHER PUBLICATIONS

WPI English Abstract of Rottmerhusen DE 43 05 767–A1 of Sep. 01, '94.

WPI English Abstract of Hoenes+Raisch/Kautt & Bux KG DE 43 44 448–A1 of Jun. 29, '95.

WPI English Abstract of Lory, Huegel & Kuenzel/Siemens DE 43 06 307–A, of Sep. 08, '94.

WPI English Abstract of Karwath/Papst, EP 0 643 473–B1 of Mar. 15, '95 (repub. Apr. 29, '98).

* cited by examiner

ELECTRONICALLY COMMUTATED MOTOR WITH GALVANICALLY SEPARATE USER INTERFACE CIRCUIT

FIELD OF THE INVENTION

The invention relates to an arrangement with an electronically commutated motor, which during operation is supplied with a DC voltage of over 100 V from an AC main, via a rectifier connected to the mains and via a direct current (DC) link connected to this rectifier.

BACKGROUND

Since in arrangements of this kind, frequently no transformer is provided between the electronically commutated motor (ECM) and the AC mains, the ECM is not galvanically separated from the AC mains, and this requires special protective measures, in order to prevent danger to the user, in the event of possible insulation damage or the like.

SUMMARY OF THE INVENTION

An object of the invention, therefore, is to provide a new arrangement of the type mentioned at the beginning. This object is achieved, according to the invention, by means of an arrangement having an electronically commutated motor, which during operation is supplied with a DC voltage of over 100 V from an AC main via a rectifier connected to this main and via a DC link connected to this rectifier, having an arrangement that is supplied with current from this AC main via a transformer and is for supplying electronic elements of the motor with a DC voltage, and having a user interface provided for transmitting information to or from the motor (16), which interface is galvanically separated from the motor and is associated with a current supply that is galvanically separated from the motor, having a comparator device provided in the user interface, which is supplied with a fluctuating DC voltage that is generated by rectifying a mains-dependent AC voltage, said fluctuating DC voltage being compared in said comparator device with a predetermined signal, in order to generate a pulse-width-modulated (PWM) signal, whose duty ratio is defined by the predetermined signal, and further comprising a device for the galvanically separated transmission of this pulse width modulated signal from the user interface to the motor. The galvanic separation achieves the fact that the user interface is separated from the motor in terms of voltage and is therefore separated from the AC mains, so that any threat to the user or operator is reliably prevented, even in the event of malfunctions in, or damage to, the motor. The pulse width modulated signal can be transmitted to the motor without trouble, e.g. via an isolating transformer, an optical fiber, or an opto-coupler.

The invention makes it possible to supply the user interface with an analog signal for the desired speed, to convert this analog signal into digital signals with a signal-dependent duty ratio in a reasonably priced manner inside the user interface, and to transmit these digital signals with the aid of an opto-coupler to the control electronics of the motor, so that they can be further processed there.

In a particularly advantageous way, the transformer has an insulated winding chamber in which a separate low-voltage winding is provided, which is used for the galvanically separated current supply of the user interface. By virtue of the fact that this separate low-voltage winding is disposed in an insulated winding chamber, a galvanic separation is produced, which permits a test voltage of 4000 V, for example. It is not necessary to provide a separate isolating transformer for this purpose; rather, the same transformer can also be used for supplying the motor electronics with low voltage. The winding provided for this can be wound in a chamber with the primary winding and separate from the separate low-voltage winding mentioned above.

Another advantageous refinement of the invention involves the feature that the output voltage of the separate low voltage winding is adapted to be supplied to the user interface in the form of a rectified fluctuating DC voltage and in the form of a smoothed DC voltage. In a particularly simple manner, the fluctuating DC voltage permits a digitizing of analog signals that are supplied to the user interface, e.g., in order to determine the speed of the motor by means of such an analog signal.

Another preferred development of the invention is distinguished by the feature that at least one opto-coupler is provided for the galvanically separated transmission of signals to or from the user interface. The use of an opto-coupler automatically produces a galvanic separation. In this connection, in another development of the invention, the signals are preferably transmitted in digitized form by way of the at least one opto-coupler. In this manner, a reliable signal transmission is obtained, down to the frequency 0.

Other details and advantageous improvements of the invention result from the exemplary embodiments, which are described below, are represented in the drawings, and are in no way to be understood as a limitation of the invention.

BRIEF FIGURE DESCRIPTION

Figure 2:
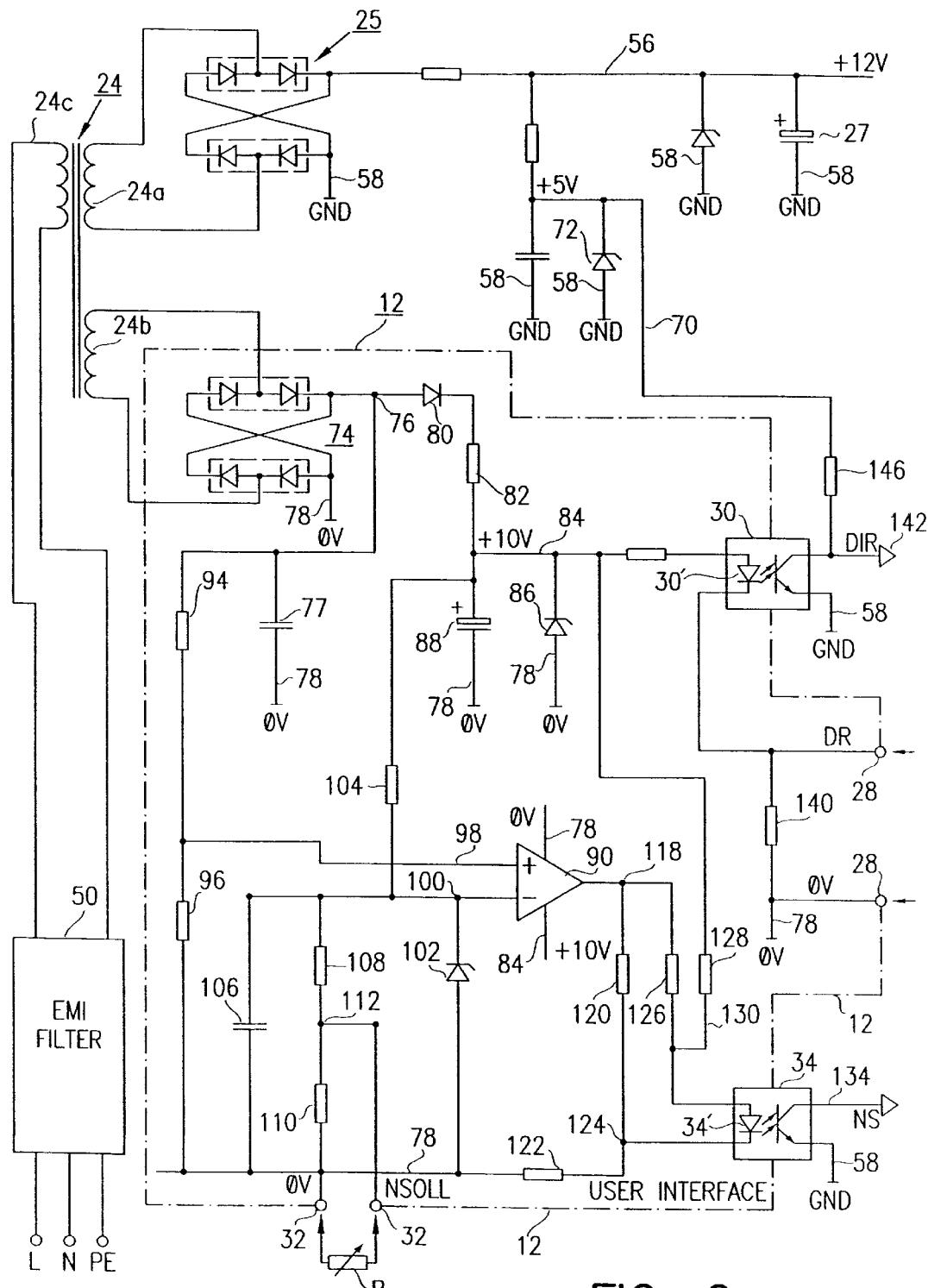
Figure 3:
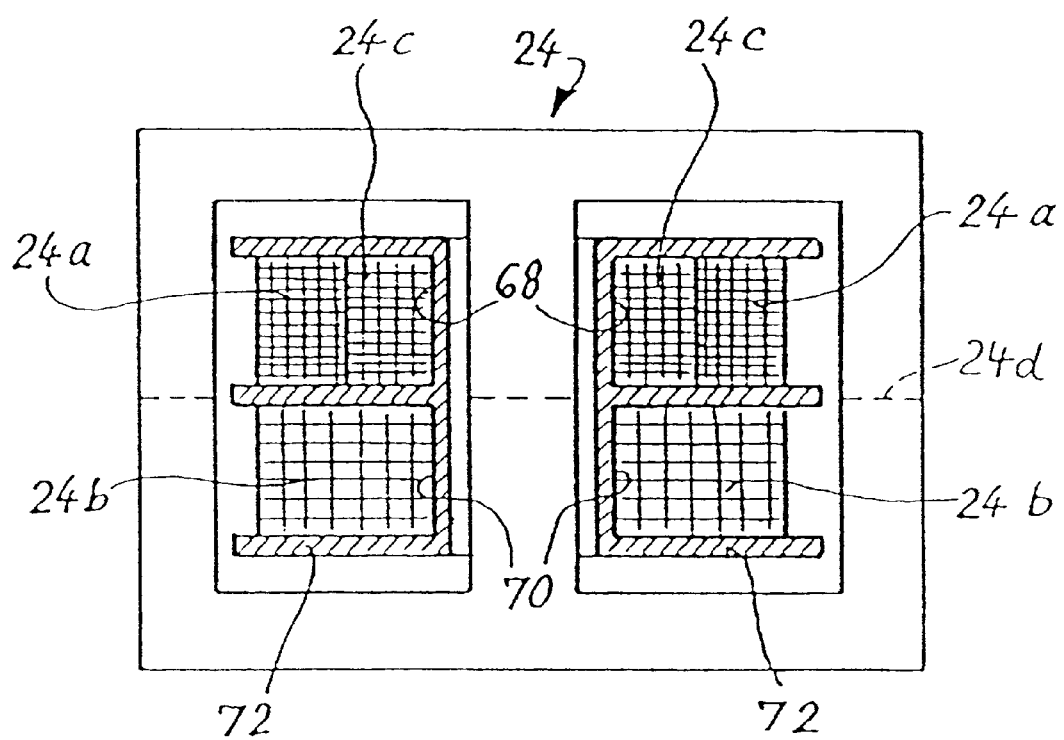

FIG. 1 is a block circuit diagram explaining the structure of an arrangement according to the invention, FIG. 2 shows details of the arrangement according to FIG. 1, and FIG. 3 is a schematic representation of a power or mains transformer, whose winding body has two winding chambers that are isolated from each other, as well as a preferred arrangement of the windings of the transformer in these winding chambers.

DETAILED DESCRIPTION

FIG. 1 illustrates, by means of a block circuit diagram, an arrangement 8 according to the invention. It includes a power supply 10, a user interface 12 that is separated from this by means of a symbolically indicated galvanic separation 11, commutation electronics 14 for the commutation of an electronically commutated motor (ECM) 16 by means of a power output stage 18, and a current limiting device 20 for limiting the current flowing through the motor 16 to a predetermined maximal value, e.g. at startup of the motor or when it is overloaded.

The power supply 10 generates a voltage $U_{ZK}$ (intermediate circuit voltage) at a DC link 22. Provided that the mains voltage 220 V is alternating current, $U_{ZK}$ is an approximately 320 V DC voltage, with which the ECM 16 is supplied directly, i.e. without the interposition of a transformer. Corresponding motor circuits are represented, for example, in EP 0 467 085 A1 HANS & MOINI, corresponding to U.S. Pat. Nos. 5,220,258, 5,343,129, 5,589,745and 5,598,073 or DE-UM 9 414 498.2. Due to the relatively high voltage, it is necessary to electrically isolate the user interface 12 completely, relative to the motor 16, by means of the galvanic separation 11.

By means of a transformer 24, the power supply 10 generates a low DC voltage of, e.g., 12 V for the commutation electronics 14 and for a Hall generator 26 provided in the motor 16, whose digital output signal "Hall" (when using a Hall IC) is supplied, as shown, to the commutation electronics 14, in order to supply thereto information on the instantaneous position of a rotor 42. This low voltage of 12 V is produced by a first secondary winding 24a of the transistor 24, whose output voltage is rectified by means of a bridge rectifier 25 and is smoothed by means of a capacitor 27.

Transformer 24 also has a second secondary winding 24b, which is separated from its primary winding 24c and the first secondary winding 24a by means of a continuous insulation, e.g. due to the fact that the primary winding 24c and the first secondary winding 24a are wound together in a first chamber of the transformer winding body, while the second secondary winding 24b is separately wound in a second winding chamber of the transformer 24 that is insulated from the first chamber. This second secondary winding 24b likewise supplies an alternating voltage, e.g. of 12 V, for powering the user interface 12.

At inputs 28 of the user interface 12, the user can specify the rotation direction of the motor 16 via a signal DR, and this information is transmitted as a signal DIR via an opto-coupler 30 to the commutation control 14.

At inputs 32 of the user interface 12, the user can preset a desired speed N, e.g. 4300 n, via a signal $N_{SOLL}$, either in the form of a DC voltage, a PWM signal, or simply in the form of a variable resistance R (FIG. 2), i.e. of a passive component (potentiometer), and then via an opto-coupler 34, a corresponding digital signal NS for the desired speed is supplied to the commutation control 14.

In addition, a signal for the current speed can be taken from the commutation control 14, e.g. the above-mentioned digital signal Hall. This signal is transmitted in digital form via an opto-coupler 36 to the user interface 12, is converted there into an analog signal, and is available there at outputs 38, e.g. for the operation of an instrument that indicates the current speed.

As can be readily seen, the user interface 12 is electrically completely insulated, relative to the rest of the arrangement 8, so that a user is not subjected to any danger whatsoever of an electrical type, when in contact with the user interface 12.

In the embodiment shown, the motor 16 has a single stator winding 40. Its permanent magnetic rotor is symbolically indicated at 42. The current through winding 40 flows through a measurement resistor 44, and the voltage at it is monitored by the current limiting arrangement 20. If this voltage becomes too high, then the current limiter 20 switches the power output stage 18 off for a short time, via the two AND gates 46, so that the current through the winding strand 40 correspondingly decreases.

At the input of the power supply 10, there is an Eletcro-Magnetic Interference (EMI) filter 50 having input terminals L, N, across which is applied an AC voltage of, e.g., 220 V. The neutral wire of the mains voltage is designated PE. The task of filter 50 is to contain interference, within the predetermined interference limit values. The mains voltage, filtered by the filter 50, is rectified directly by means of a full bridge rectifier 52, smoothed by means of a capacitor 54, and supplied via the line 22 to the power output stage 18 of the motor 16. In this way, the output stage 18, and consequently also the motor winding 40, are operated with approx. 320 V of DC voltage. Since the commutation electronics 14 can only be operated with low voltage, the transformer 24 is required for this. The negative potential of the DC voltage of 12 V, whose positive potential is present in a line 56, is connected to the negative potential of the voltage $U_{ZK}$, as depicted by the common ground connections 58. Therefore, there is no galvanic separation, with respect to the mains voltage, at the inputs L, N.

Since the DC link voltage $U_{ZK}$ and the DC voltage of 12 V (in the line 56) have the same ground potential, the primary winding 24c and the first secondary winding 24a of the transformer 24 can be wound in the same chamber of a winding body. For safety reasons, though, the supply voltage of the user interface 12 must be galvanically separated from the mains voltage (at the terminals L, N). For the purpose of galvanic separation, the second secondary winding 24b is therefore preferably wound in a separate chamber of the transformer 24. As a result of this structure of the transformer 24, no other isolation measures are needed, and reasonably-priced two-chamber winding bodies can be used for the transformer 24, by means of which its costs are kept within limits.

Numeral 62 designates a mains monitor, which monitors the voltage $U_{ZK}$ in the line 22 and the DC voltage (e.g. +12 V) in the line 56. The reason for this is as follows: when switching on the arrangement 8, i.e. when supplying mains voltage to the terminals L and N, the voltage $U_{ZK}$ (in the line 22) increases very rapidly, while it takes longer to build up the DC voltage in the line 56, which supplies the Hall generator 26, the commutation control 14, and the current limiter 20 with energy.

For this reason, without the mains monitor 62, the switching state of the output stage 18 would not be unambiguously defined. Since the output stage 18 is preferably a full bridge circuit, this unclearly defined switching state could lead to a short circuit in this bridge.

An analogous problem arises when the arrangement 8 is switched off from the utility main. Here, too, the DC voltage in the line 56 goes to zero significantly faster than the voltage $U_{ZK}$ in the line 22, because when the switch-off occurs, the rotor 42 continues to rotate and supplies energy back to the DC link, i.e. the line 22, until the rotor comes to a stop. Therefore, $U_{ZK}$ decreases in proportion to the speed of the motor 16 and here, too, without the mains monitor, it can lead to a short circuit in the full bridge circuit (in the output stage 18) or to an overvoltage at the output stage 18, which likewise jeopardizes this output stage.

The mains monitor 62 therefore detects the voltage $U_{ZK}$ and the voltage in the line 56. If the latter becomes too low, and $U_{ZK}$ lies above a predetermined value, the mains monitor supplies the line 56 with a DC voltage, e.g. from a battery provided for this (not shown), or from the line 22 by means of a voltage regulator (not shown).

In this manner, the commutation of the motor 16 is assured, directly from switch-on, by the commutation control 14, as well as from switch-off until the rotor 42 comes to a stop. The current limiter 20 also becomes effective in this manner, starting directly from switch-on, and thus prevents any overloading of output stage 18, and destruction thereof.

FIG. 2 shows the structure of the user interface 12 in detail. The primary winding 24c of the transformer 24 is connected via the EMI filter 50 (terminals L, N) to an AC mains (not shown).

Line 56 (+12 V) is powered by the first secondary winding 24a, which is wound together with the primary winding 24c in a chamber 68 (FIG. 3) of an isolating winding body 72 of the transformer 24, while the second secondary winding 24b is wound in a second chamber 70 of the winding body 27 separate from this. The dividing line, between the two halves of the transformer core, is designated 24d.

The first secondary winding 24a also powers a line 70', on which a Zener diode 72' generates a voltage of +5 V, measured with respect to ground 58.

The output voltage of the second secondary winding 24b is supplied to a full bridge rectifier 74 in the user interface 12. Its positive output is designated 76, and its negative output is designated 78. The latter is also designated 0 V, since it is not connected to the ground 58 of the motor 16, but represents an internal potential of the user interface 12.

Across the outputs 76 and 78, there is a pulsating DC voltage with a frequency of 100 Hz, which serves, in the user interface 12, to digitize a signal $N_{SOLL}$ fed to the input 32 for the desired speed of the motor 16. (In this instance, this signal can be supplied as a DC voltage with a voltage range of e.g. 0 to 10 V, or can be supplied as a pulse width modulated signal (PWM signal), or simply by virtue of the fact that a variable resistor R (FIG. 2), e.g. a potentiometer, is connected to the input 32. The latter has the particular advantage that the user does not have to supply any active, i.e. energy-supplying, set point or target value signal. The pulsating DC voltage between the outputs 76 and 78 is filtered by a small capacitor 77 (e.g. 100 Nf) in order to filter out high-frequency components from the pulsating DC voltage.

Starting from the output 76, a diode 80 and a resistor 82 lead to a line 84, on which a Zener diode 86 and a smoothing capacitor 88 generate a smoothed DC voltage of +10 V, which is used to supply current to the LEDs 30', 34' of the two opto-couplers 30, 34 and to a comparator 90.

In this instance, the secondary winding 24b thus functions like an isolating transformer, which galvanically separates the user interface 12 from the AC mains and from the motor 16. The test voltage for the isolation of the winding 24b, relative to the other windings, can be 4000 V, for example.

The pulsating DC voltage (100 Hz) across the connections 76, 78 is fed via a voltage divider 94, 96 to the positive input 98 of the comparator 90. The negative input 100 of this comparator is limited to a predetermined maximal voltage via a Zener diode 102 and a resistor 104. A capacitor 106 and the series circuit of two resistors 108, 110 are disposed parallel to the Zener diode 102, between the input 100 and the line 78 (0 V) and the connecting point 112 of these resistors is connected to one of the inputs 32, which can be supplied with a signal value for the desired target speed $N_{SOLL}$, e.g. in the form of a DC voltage between 0 and 10 V. If the target speed is supplied in the form of a PWM signal, this is smoothed by means of the resistor 108 and the capacitor 106.

The pulsating DC voltage at the positive input 98 of the comparator 90 can be thought of approximately as a delta voltage. If the voltage is low between the inputs 32, then the potential of the negative input 100 is low, and the output 118 of the comparator 90 is therefore high for only a short time during each period of the pulsating DC voltage (100 Hz corresponds to 10 ms), e.g. for 1 ms, and then is low for 9 ms, i.e. a low pulse duty ratio is produced at the output 118.

If the voltage between the inputs 32 is high, then the output 118 is correspondingly high during each period of the pulsating DC voltage, e.g. is high for 6 ms and low for 4 ms, i.e. the duty ratio at the output 118 increases when the DC voltage signal at the input 32 increases.

The output 118 of the comparator 90 is connected to the line 78 via the series circuit of two resistors 120, 122. Their connecting point 124 is connected to the cathode of the LED 34, in the opto-coupler 34.

The output 118 is likewise connected via the series circuit of two resistors 126, 128 to the line 84 (+10 V). Their connecting point 130 is connected to the anode of the LED 34'.

Therefore, as long as the output 118 of the comparator 90 is high, the LED 34' receives an operating voltage, illuminates, and therefore transmits the digital signal NS to the output 134 of the opto-coupler 34. However, if the output 118 is low, then the LED 34, receives no voltage and therefore does not illuminate. As a result, a corresponding signal NS is obtained at the output 134.

For presetting the rotation direction for the motor 16, a resistor 140 can be connected between the inputs 28 of the user interface 12, by means of which the LED 30' in the opto-coupler 30 illuminates, the signal DIR at the output 142 of the opto-coupler 30 becomes low, and the motor 16 is switched over to a rotation counter to its preferred direction. If the resistor 140 is omitted, then the LED 30' is without current and the signal DIR becomes high, by means of which the motor 16 is switched over to its preferred direction.

The output 142 is connected via a resistor 146 to the line 70 (+5 V).

The digital signals DIR and NS are galvanically separated from the user interface 12 by means of the opto-couplers 34 and 30, respectively, so that a galvanic separation exists here as well.

Naturally, a large number of alterations and modifications are possible within the scope of the current invention. In lieu of the second secondary winding 24b, a separate isolation transformer, for example, could be provided with a corresponding winding, but the embodiment shown is preferable, due to its highly favorable cost.

What is claimed is:

1. An arrangement comprising an electronically commutated motor,
    a first rectifier connected to AC mains,
    a DC link having an input connected to an output of said first rectifier and an output which supplies windings of said motor, during operation, with a first DC voltage of over 100 V,
    further comprising a power supply subcircuit including a transformer, having a primary winding coupled to said AC mains and a secondary winding, and a second rectifier, said secondary winding of said transformer supplying electronic elements of the motor, via said second rectifier, with a second DC voltage lower than said first DC voltage,
    further comprising a user interface for controlling the motor, this user interface being galvanically separated from the motor and being associated with a current supply that is galvanically separated from the motor, said user interface comprising a comparator device which is supplied with a fluctuating DC voltage generated by rectifying a mains-dependent AC voltage, said fluctuating DC voltage being compared with a predetermined signal, in order to generate a pulse-width-modulated (PWM) signal whose duty ratio is defined by the predetermined signal, said user interface including a device for galvanically separated transmission of this pulse-width-modulated signal from the user interface to the motor.

2. The arrangement according to claim 1, wherein the transformer has an isolated winding chamber in which a separate low-voltage winding is provided, which is used for galvanically separated supply of current to the user interface.

3. The arrangement according to claim 2, wherein the output voltage of the separate low-voltage winding is adapted to be supplied to a second rectifier and is adapted to be supplied from said second rectifier to the user interface in the form of a rectified, fluctuating DC voltage and in the form of a smoothed DC voltage.

4. The arrangement according to claim 1, further comprising
at least one opto-coupler providing galvanically separated transmission of signals among the user interface and the motor.

5. The arrangement according to claim 4, wherein the at least one opto-coupler transmits said signals in digital form.

6. The arrangement according to claim 1, wherein the predetermined signal is adapted to be supplied to the comparator in the user interface in the form of an external DC voltage signal.

7. The arrangement according to claim 6, wherein the user interface comprises a filter device which receives the predetermined signal in the form of an external PWM signal, smooths said PWM signal, and then supplies the smoothed signal to the comparator device.

8. The arrangement according to claim 1, wherein
the user interface comprises an input which is connected to a variable resistance (R), by means of which the predetermined signal, supplied to the comparator device, is adjustable, in order to change the duty ratio of the pulse width modulated signal at the output of the comparator devices as a function of the value of this resistance (R).

9. The arrangement according to claim 2, further comprising
at least one opto-coupler providing galvanically separated transmission of signals among the user interface and the motor.

10. The arrangement according to claim 3, further comprising
at least one opto-coupler providing galvanically separated transmission of signals among the user interface and the motor.

11. The arrangement according to claim 9, wherein the at least one opto-coupler transmits said signals in digital form.

12. The arrangement according to claim 2, wherein the predetermined signal is supplied to the comparator in the user interface in the form of an external DC voltage signal.

13. The arrangement according to claim 3, wherein the predetermined signal is supplied to the comparator in the user interface in the form of an external DC voltage signal.

14. The arrangement according to claim 4, wherein the predetermined signal is supplied to the comparator in the user interface in the form of an external DC voltage signal.

15. The arrangement according to claim 12, further comprising a filter device which receives the predetermined signal in the form of an external PWM signal, smooths said PWM signal, and then supplies the smoothed signal to the comparator device.

16. The arrangement according to claim 13, further comprising a filter device which receives the predetermined signal in the form of an external PWM signal, smooths said PWM signal, and then supplies the smoothed signal to the comparator device.

17. The arrangement according to claim 14, further comprising a filter device which receives the predetermined signal in the form of an external PWM signal, smooths said PWM signal, and then supplies the smoothed signal to the comparator device.

18. The arrangement according to claim 2, wherein
the user interface has an input which is connected to a variable resistance (R), by means of which the predetermined signal, supplied to the comparator device, is adjustable in order to change the duty ratio of the pulse width modulated signal at the output of the comparator device as a function of the value of this resistance (R).

19. The arrangement according to claim 3, wherein
the user interface has an input which is connected to a variable resistance (R), by means of which the predetermined signal, supplied to the comparator device, is adjustable in order to change the duty ratio of the pulse width modulated signal at the output of the comparator device as a function of the value of this resistance (R).

20. The arrangement according to claim 4, wherein the user interface has an input which is connected to a variable resistance (R), by means of which the predetermined signal, supplied to the comparator device, is adjustable in order to change the duty ratio of the pulse width modulated signal at the output of the comparator device as a function of the value of this resistance (R).

* * * * *

UNITED STATES PATENT AND TRADEMARK OFFICE
CERTIFICATE OF CORRECTION

PATENT NO : 6,169,378
DATED : January 2, 2001
INVENTOR(S) : Karwath

It is certified that error appears in the above-identified patent and that said Letters Patent are hereby corrected as shown below:

At abstract, line 14 before "electrically" --is-- should be inserted.

At column 6, line 9, "34," should read --34'--

At column 7, line 27, claim 8 line 7 "devices" should read --device,--

Signed and Sealed this

Twenty-ninth Day of May, 2001

Attest:

NICHOLAS P. GODICI

Attesting Officer

Acting Director of the United States Patent and Trademark Office